United States Patent
Karlsson

(10) Patent No.: US 8,385,938 B2
(45) Date of Patent: Feb. 26, 2013

(54) RADIO RESOURCE MANAGEMENT BASED ON LOAD AND CHANNEL INACTIVITY

(75) Inventor: Patrik Karlsson, Alta (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 971 days.

(21) Appl. No.: 11/720,513

(22) PCT Filed: Dec. 3, 2004

(86) PCT No.: PCT/SE2004/001800
§ 371 (c)(1),
(2), (4) Date: May 30, 2007

(87) PCT Pub. No.: WO2006/059932
PCT Pub. Date: Jun. 8, 2006

(65) Prior Publication Data
US 2008/0014959 A1     Jan. 17, 2008

(51) Int. Cl.
*H04W 72/00* (2009.01)
(52) U.S. Cl. ..... 455/453; 455/450; 455/451; 455/452.1; 455/452.2; 455/509; 455/464
(58) Field of Classification Search .......... 455/453, 455/450–452.2, 464, 509
See application file for complete search history.

(56) References Cited

U.S. PATENT DOCUMENTS

| | | | |
|---|---|---|---|
| 2002/0118697 A1* | 8/2002 | Gopalakrishnan et al. ... | 370/441 |
| 2002/0136193 A1* | 9/2002 | Chang et al. ........... | 370/347 |
| 2003/0016698 A1* | 1/2003 | Chang et al. ........... | 370/469 |
| 2003/0210660 A1* | 11/2003 | Wiberg et al. ........... | 370/320 |
| 2003/0236094 A1* | 12/2003 | Jami et al. ........... | 455/450 |
| 2005/0287949 A1* | 12/2005 | Harris et al. ........... | 455/9 |

FOREIGN PATENT DOCUMENTS
EP   1343343 A1 *   9/2003

* cited by examiner

*Primary Examiner* — Jean Gelin
*Assistant Examiner* — Dung Hong
(74) *Attorney, Agent, or Firm* — Roger S. Burleigh

(57) ABSTRACT

The data transmission activity of established connections is monitored along with a measure of the load or drain on communication resources. When the load on communication resources increases or when it moves past a threshold, inactivity over an connection is not permitted or is permitted for a shorter time before releasing that user's connection. On the other hand, lower loads allow for a longer (or no) inactivity period before disconnecting the connection. Once inactivity on a connection exceeds the time determined based on load, that connection may be transferred to a lower capacity channel, e.g., a common channel. Alternatively, that inactive connection may be disconnected.

14 Claims, 3 Drawing Sheets

RADIO RESOURCE MANAGEMENT BASED ON LOAD AND CHANNEL INACTIVITY

TECHNICAL FIELD

The present invention field relates to wireless communication and provides radio resource management based on load and channel inactivity. One particularly advantageous (but non-limiting) application is to packet transmission scheduling of the High Speed Downlink Packet Access (HSDPA) system operated in a Universal Mobile Telecommunications System (UMTS) terrestrial radio access network (UTRAN).

BACKGROUND AND SUMMARY

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. As wireless Internet services have become popular, various services require higher data rates and higher capacity. Although UMTS has been designed to support multi-media wireless services, the maximum data rate is not enough to satisfy the required quality of services. High Speed Downlink Packet Access (HSDPA) improves the radio capacity in the downlink and provides a maximum data rate of 10 Mbps. HSDPA achieves higher data speeds is by shifting some of the radio resource coordination and management responsibilities to the base station from the radio network controller. Those responsibilities include one or more of the following briefly described below: shared channel transmission, higher order modulation, link adaptation, radio channel dependent scheduling, and hybrid-ARQ with soft combining.

In shared channel transmission, radio resources, like spreading codes and transmission power in the case of Code Division Multiple Access (CDMA)-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

Radio channel conditions experienced on different communication links typically vary significantly, both in time and between different positions in the cell. In traditional CDMA systems, power control compensates for differences in variations in instantaneous radio channel conditions. With this type of power control, a larger part of the total available cell power may be allocated to communication links with bad channel conditions to ensure quality of service to all communication links. But radio resources are more efficiently utilized when allocated to communication links with good channel conditions. For services that do not require a specific data rate, such as many best effort services, rate control or adjustment can be used to ensure there is sufficient energy received per information bit for all communication links as an alternative to power control. By adjusting the channel coding rate and/or adjusting the modulation scheme, the data rate can be adjusted to compensate for variations and differences in instantaneous channel conditions.

For maximum cell throughput, radio resources may be scheduled to the communication link having the best instantaneous channel condition. Rapid channel dependent scheduling performed at the bases station allows for very high data rates at each scheduling instance and thus maximizes overall system throughput. Hybrid ARQ with soft combining increases the effective received signal-to-interference ratio for each transmission and thus increases the probability for correct decoding of retransmissions compared to conventional ARQ. Greater efficiency in ARQ increases the effective throughput over a shared channel.

FIG. 1 illustrates a high speed shared channel concept where multiple users 1, 2, and 3 provide data to a high speed channel (HSC) controller that functions as a high speed scheduler by multiplexing user information for transmission over the entire HS-DSCH bandwidth in time-multiplexed intervals. For example, during the first time interval shown in FIG. 1, user 3 transmits over the HS-DSCH and may use all of the bandwidth allotted to the HS-DSCH. During the next time interval, user 1 transmits over the HS-DSCH, the next time interval user 2 transmits, the next time interval user 1 transmits, etc.

High-speed data transmission is achieved by allocating a significant number of spreading codes (i.e., radio resources in CDMA systems) to the HS-DSCH. FIG. 2 illustrates an example code tree with a fixed Spreading Factor (SF) of sixteen. A subset those sixteen codes, e.g., twelve, is allocated to the high-speed shared channel. The remaining spreading codes, e.g., four are shown in the figure, are used for other radio channels like dedicated, common, and broadcast channels.

Although not necessarily preferred, it is also possible to use code multiplexing along with time multiplexing. Code multiplexing may be useful, for example, in low volume transmission situations. FIG. 3 illustrates allocating multiple spreading codes to users 1, 2, and 3 in code and time multiplexed fashion. During transmission time interval (TTI) 1, user 1 employs twelve codes. During transmission time interval 2, user 2 employs twelve spreading codes. However, in transmission time interval 3, user 1 uses two of the codes, and user 3 uses the remaining ten codes. The same code distribution occurs in TTI=4. In TTI=5, user 3 uses two of the codes while user 2 uses the remaining codes.

With HSDPA and other features being added to new 3GPP releases, the dedicated resource cost to maintain an already-established HSC connection is relatively low from both the network and the UE subscriber perspective. A resource cost is any hardware or software resource allocated to support a radio connection. Example resource costs include: uplink and downlink transmit power, uplink and downlink spreading and channelization codes, radio base station hardware resources, data processing costs like memory storage and computational operations processed, and communication resources between nodes in the radio network used to monitor and maintain a connection, etc. This is because low activity users for which an HSC connection has already been established are not scheduled for transmission when there is no data to send. But there is some amount of resources required to maintain each HSC connection, and there is a limit to the number of HSC connections that can be maintained. While perhaps convenient for users to have their already-established HSC connections remain at the ready for possible future data transmission, it is still a waste of resources that could be used for other users that actually currently need those occupied resources. This is also the case for users for which a dedicated traffic channel is initially established, but are not currently actively using the capacity of that dedicated channel, on the uplink and/or on the downlink.

System throughput, accessibility, and retainability will suffer unnecessarily. For example, the downlink code tree in a CDMA-based communications system has a fixed size for each cell. The number of possible users in the code tree depends on the spreading factor (SF) of the connections, (e.g., SF=256=>256 users, SF=128=>128 users, SF=64=>64 etc). If a first user is allocated to a HSC, the first user "consumes" one code position of the code tree, thereby preventing a second user from using that one code position in the code tree. If the first user is not actively transmitting or receiving, and the second user with data to be sent or received is denied transmission because there is no free downlink code transmit, then the second user is not serviced (denied access). The HSC is also used less efficiently transferring less data than it could, i.e., the HSC throughput is lower.

Due to user mobility and radio variations, the total transmit power required by all established connections may occasionally become too high. In those situations, the system may be required to disconnect one or more connections to decrease that total power. It would be better if the mobile communications network first reduced the power by disconnecting those connections transmitting little or no data. By making these unused or lightly used resources available for active users, it is also less likely that active users are rejected (due to lack of resources in the cell) or dropped when performing a cell handover to another cell.

Consequently, the data transmission activity of established connections is monitored along with a measure of the load or drain on communication resources. When the load on communication resources increases or when it moves past a threshold, inactivity over an connection is not permitted or is permitted for a shorter time before releasing that user's connection. On the other hand, a lower load allows for a longer (or no) inactivity period before disconnecting the connection. Once inactivity on a connection exceeds the time determined based on load, that connection may be transferred to a lower capacity channel, e.g., a common channel. Alternatively, that inactive connection may be disconnected.

Although applicable to any type of channel for which a mobile user connection can be established and maintained, (and thereby consuming resources), in one non-limiting, example implementation, a mobile communications network supports mobile radio communication over multiple cell coverage areas, with at least one of the cell coverage areas including a high speed shared radio channel (HSC). A load associated with the high speed shared radio channel is determined. An activity level is detected for the high speed shared radio channel connection. If the HSC connection is detected as being inactive, a corresponding inactivity time period is determined for the high speed shared radio channel connection based on the detected load. During the inactivity time period, the activity level of the high speed shared radio channel connection is monitored to determine whether resources allocated for the high speed shared radio channel connection should be released. Similar procedures may be applied to each of multiple high speed shared radio channel connections on the high speed shared radio channel as well as to multiple high speed shared radio channels.

The load may be determined based on one or more of the following example load parameters: data processing resources, hardware utilization, allocated radio channel resources, power, number of users on the high speed shared radio channel, or interference. An inactive high speed shared radio channel connection may be detected when a corresponding amount of data to transmit over the high speed shared radio channel is less than a predetermined amount. Optionally, that inactivity threshold detection may have to be sustained for a predetermined period of time before concluding that the connection is inactive to avoid making a premature inactivity decision.

The activity timer for a high speed shared radio channel connection detected as inactive may be inactivated if the connection's activity level exceeds an activity threshold (optionally the level exceeds the threshold for a predetermined time period). If the monitored activity level does not exceed the activity threshold by the time the inactivity time period is over, the allocated resources for the HSC connection are released, and the user connected transferred to a lower capacity channel such as a common channel. Also, if the monitored activity level does not increase above an activity threshold by the time the inactivity time period is over, a state of the detected high speed shared radio channel may be changed from an active state to another state.

DETAILED DESCRIPTION

The following description sets forth specific details, such as particular implementations, procedures, techniques, etc. for purposes of explanation and not limitation. It will be appreciated by one skilled in the art that other implementations may be employed a part from these specific details. For example, although the following description is facilitated using non-limiting UMTS examples, the present invention may be employed in any mobile communications network that employs a high speed shared channel. In some instances, detailed descriptions of well-known methods, interfaces, circuits and signaling are omitted so as to not obscure the description with unnecessary detail. Moreover, individual blocks are shown in the figures. Those skilled in the art will appreciate that the functions of those blocks may be implemented using individual hardware circuits, using software programs and data in conjunction with a suitably programmed digital microprocessor or general purpose computer, using application specific circuitry (ASIC), and/or using one or more digital signal processors (DSPs).

Figure 4:
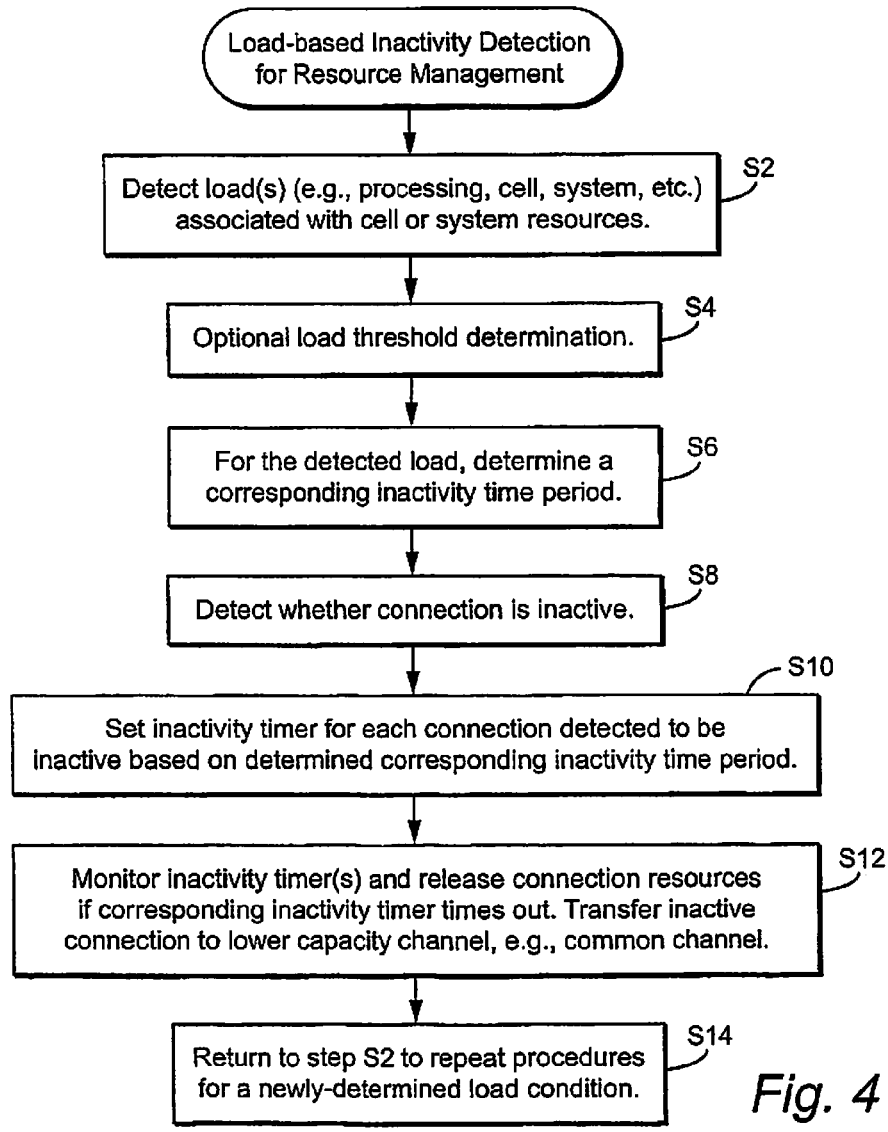
FIG. 4 is a flowchart diagram outlining example load-based inactivity timer detection for regulating resource use on one or more dedicated or HSC channels.

In general, the technology described finds particularly advantageous application to managing resources of a high speed shared channel (uplink or downlink) in a mobile communications system. But as indicated above, this technology may be applied to any type of channel for which a mobile user connection can be established and maintained, and which therefore, consumes resources. FIG. 4 is a flowchart illustrating example procedures for radio resource management using load-based inactivity detection for one or more radio channels, e.g., a dedicated traffic channel or a HSC. One or more cells in the mobile communications system may support an HSC in addition to other types of radio channels, e.g., dedicated channels, control channels, broadcast channels, etc. Each radio base station has one or more associated cells.

A load associated with the cell or system resources is detected (step S2). The load may be a data processing load associated with the cell alone or in the cell along with one or more neighboring cells, a radio resource(s) usage load associated with the cell alone or in the cell along with one or more neighboring cells, an interference level associated with the cell alone or in the cell along with one or more neighboring cells, or other load parameter. Other non-limiting examples of load include: hardware utilization, power, number of users on the high speed shared radio channel, or spreading factors and/or codes. More than one load parameter may be used to determine the load for use in managing resources. An optional step S4 compares the detected load to a predetermined load threshold (which could be zero or non-zero). If the load is below a threshold, it may not be desirable to monitor inactivity levels of HSC connections.

If the load exceeds such a threshold, or if step S4 is not used, an inactivity time period is determined corresponding to the determined load (step S6). Then one or more connections are monitored to determine whether it is inactive (step S8). For example, the activity level may be compared to a minimum threshold (which could be zero or non-zero). For example, inactivity of an established connection may be determined when a corresponding amount of data to transmit over this HSC connection is less than a predetermined amount. Optionally, it may be desirable for that data amount to be below the threshold minimum amount for a predetermined period of time to avoid a premature inactivity determination.

For each connection determined to be inactive, an inactivity timer is set using the corresponding inactivity time period determined in step S6 (step S10). Each inactivity timer is monitored, and the established resources for a connection that remains inactive for the inactivity time period are released (step S12). That connection is preferably transferred to or re-established on a lower capacity channel like a low speed common channel, but the connection could also be released. The process regularly repeats to account for changing load conditions (step S14). The steps described in FIG. 4 are preferably implemented by one or more nodes in the radio access network of the mobile communications system.

Figure 5:
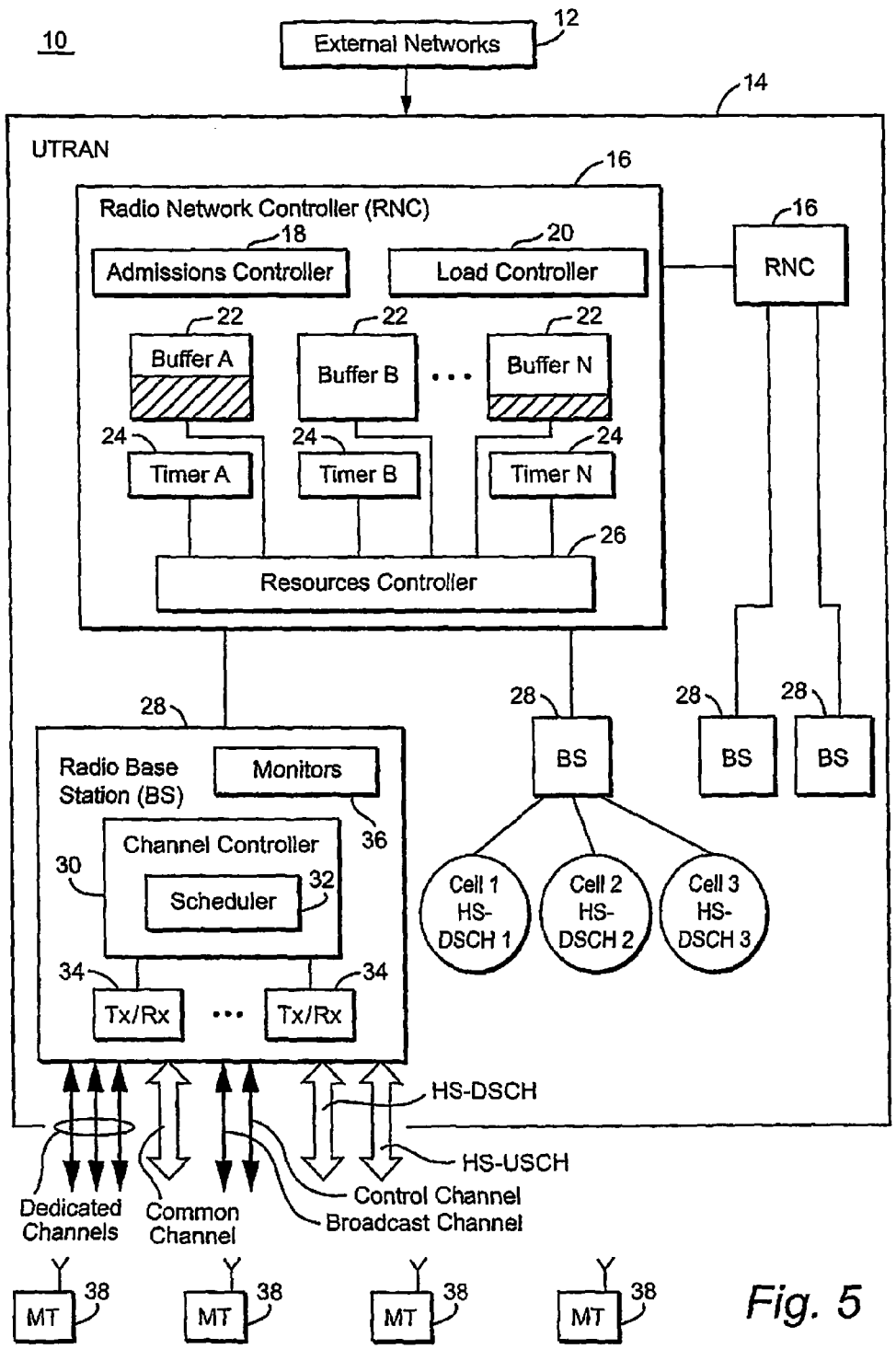
FIG. 5 is a function block diagram illustrating one non-limiting example implementation for the procedures illustrated from FIG. 4.

Reference is made to a non-limiting example mobile communication system 10 in FIG. 5. Plural external networks 12 are coupled to a CDMA-based radio access network 14 which, for example, may be a UMTS Terrestrial Radio Access Network (UTRAN). The UTRAN 14 includes one or more radio network controllers (RNC) 16 which may communicate over a suitable interface. In this example, the procedures in FIG. 4 are carried out primarily in the RNC, though that need not be the case with some or all of the procedures being carried out in the radio base stations or one or more external networks. Each RNC 16 may include, among other things, an admissions controller 18, a cell load controller 20, and resource controller 26. Each of the controller entities may be implemented in hardware, software, or a combination of both.

Each RNC 16 is coupled to one or more radio base stations (BS) 28. Each radio base station 28 is associated with one or more cells, and includes, among other things, radio transceiving circuitry 34, one or more monitors 28, and a channel controller 33 which may include a scheduler 32. The monitors may include, for example, a HS-DSCH code usage monitor, a transport format usage monitor, an average load monitor, an empty buffer monitor, a power monitor, etc. which may or may not be used in managing resources for a particular channel. For example, some of these monitored values may be more useful in managing the resources of a HS-DSCH than the resources of an uplink or downlink dedicated channel.

The radio base station 28 communicates over a radio interface with various mobile stations identified mobile terminals (MTs) 38. Communications over the radio interface are made using spreading codes, i.e., one or more spreading codes corresponds to a radio channel. Each base station 28 employs different types of radio channels: one or more dedicated channels, one or more low speed common channels, one or more broadcast channels, and for at least one base station, a high speed downlink shared channel (HS-DSCH). Each of multiple cells associated with a single base station may have its own HS-DSCH.

Figure 1:
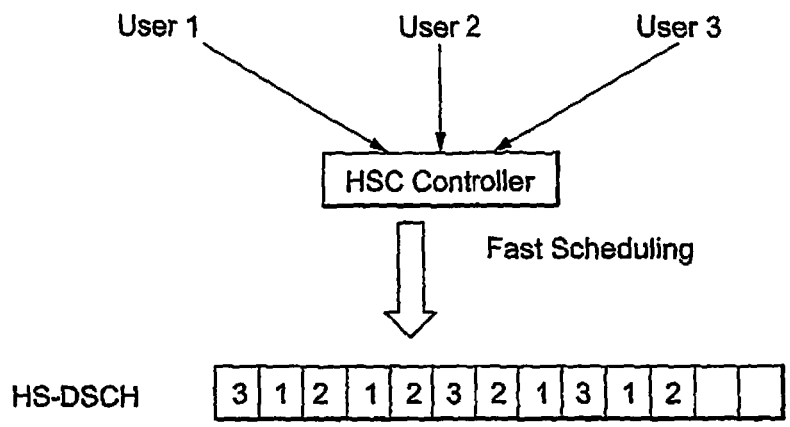
FIG. 1 illustrates conceptually a high speed downlink shared channel.
Figure 2:
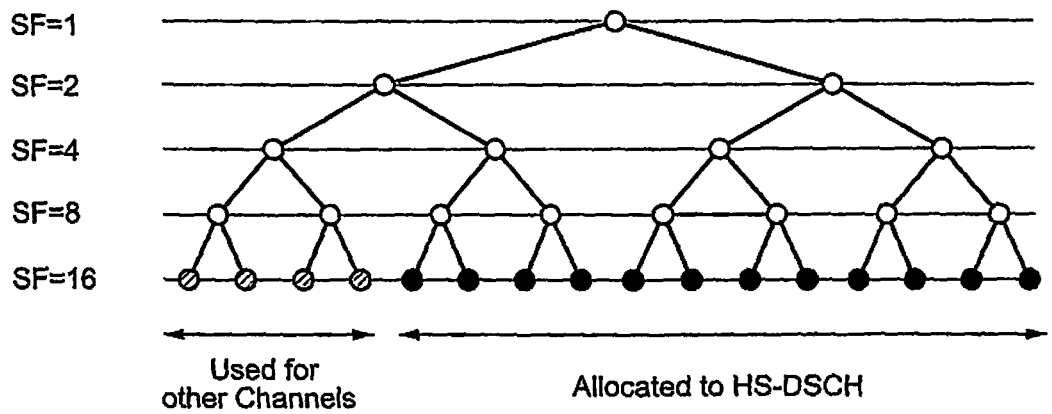
FIG. 2 illustrates a code tree.
Figure 3:
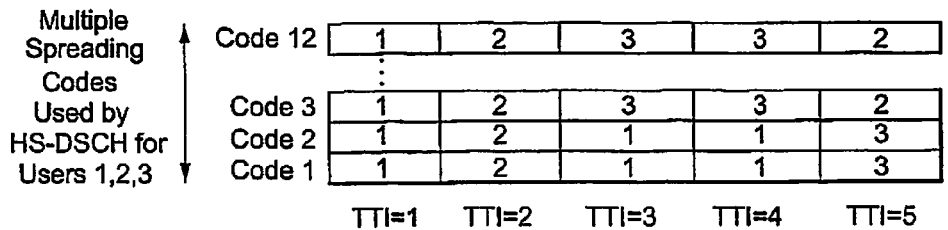
FIG. 3 illustrates a time division code division multiplex diagram in conjunction with the high speed downlink shared channel.

For a HS-DSCH, the channel controller 30 may perform the various functions described above for a high speed downlink shared channel such as shared channel transmission, higher order modulation, link adaptation, radio channel dependent scheduling, and hybrid-ARQ with soft combining. Particularly, the scheduler 32 controls fast scheduling of transmissions (and retransmissions) over the high speed downlink shared channel in each transmission time interval (TTI). The channel controller 30 preferably allocates all of the codes allocated to the high speed downlink channel to a single mobile radio MT connection in one TTI. But if the payload is insufficient for a single MT connection, or if the MTs are low-end MTs, code division multiplexing may also be employed by the radio resource controller 26, as explained above with regard to FIG. 3. For the admissions controller 18 to perform admissions control, the load controller 20 to perform load control, and the resource controller 26 to optimally manage radio resources in each cell, the RNC 16 receives relevant measurement information from the base station 28 and from various mobile terminals (MT) 38.

The RNC 16 includes multiple buffers (A, B, . . . , N) 22. Each buffer 22 is associated with an established user connection and stores data for that user connection to be transmitted over a dedicated channel or the HS-DSCH. The resources controller 26 monitors the activity level for each established dedicated and HS-DSCH connection by measuring the amount of data stored in the corresponding buffer 22 and by making an appropriate comparison, such as described above in FIG. 4. The resources controller 26 also determines an inactivity time period based on a load calculation made in the load controller 20 or based on load information provided by the load controller 20. Any suitable load-to-inactivity relationship may be adopted. But in general the higher the load (e.g., once the load is over a threshold), the shorter the inactivity time interval.

Each buffer 22 for which an inactivity determination is made has a corresponding timer 24 (software or hardware) set with the inactivity timer period (A, B, . . . , N). The channel resources controller 26 monitors the buffer amounts and the timer values for each inactive connection to determine whether to release that connection for inactivity as described above in conjunction with FIG. 4. If sufficient activity is detected before the inactivity timer 24 times out, the timer 24 is either reset or deactivated. In the example shown in FIG. 5, buffer A is half filled with data to send, buffer B is empty, and buffer C is about ¼ filled. Connection B might be detected as inactive (assuming there is a sufficient load), and timer B would be started with an inactivity time period based on the load.

When a connection is initially established, it is designated an active connection in the UTRAN 14, meaning it is in an active usage state. When that connection is determined to be inactive, the MT enters an low activity state, examples of which include busy or idle states. When dedicated or HS-DSCH channel resources are released for an inactive connection, that connection may be transferred to a lower speed common channel like a forward access common channel (FACH) so that the user connection is still served by the network but at a lower cost.

The base station also includes a buffer for each mobile terminal connection. In another example implementation, the inactivity timers could therefore be implemented in the base station associated with a corresponding base station buffer. The load could be determined by the base station channel controller 30 using information gathered from one or more of the monitors 36 and/or received from the RNC 16. In that case, the base station channel controller 30 determines HS-DSCH connection inactivity based on the data amounts in corresponding base station buffers and monitors the set timers. Alternatively, these functions could be performed cooperatively with two or more nodes, e.g., the RNC and the base station. Similarly, the monitors 36 could be included in the RNC 16.

The RNC and/or the base station may also keep track of activity levels in the uplink direction for each mobile user connection, e.g., over an uplink dedicated channel. In this uplink application, similar procedures may be followed including, for example, load-based inactivity detection, release of channel resources, and transfer of the uplink connection to a lower speed uplink channel, like a reverse access channel (RACH).

By monitoring data transmission activity for established connections and releasing resources for those connections when they are inactive for a predetermined time based on load, the resources required to maintain those inactive connections are freed up to better serve other users. The inactive connections can be transferred to lower capacity channels (from a single user's perspective) better suited for lower activity such as a common channel.

While the invention has been described in connection with an example embodiment, it is not limited to a disclosed embodiment or example, but on the contrary, is intended to cover various modifications and equivalent arrangements included within the scope of the appended claims.

The invention claimed is:

1. A method in a mobile communications network supporting mobile radio communication using high speed shared channels associated with a cell coverage area, wherein each high speed shared channel provides connections to a plurality of mobile terminals sharing the high speed shared channel, the method comprising:
   (a) determining an aggregate load associated with said plurality of mobile terminals sharing the high speed shared channel;
   (b) detecting inactivity on a first connection provided by the high speed shared channel to one of said plurality of mobile terminals;
   (c) setting a corresponding inactivity time period for the first connection based on the determined aggregate load associated with said plurality of mobile terminals sharing the high speed shared channel; and,
   (d) during the inactivity time period, monitoring an activity level of the first connection to determine whether resources of the first connection should be released and, if the monitored activity level does not increase above an activity threshold by the time the inactivity time period expires, releasing the resources of the first connection.

2. The method according to claim 1, further comprising the step of transferring the first connection to a second radio channel requiring fewer resources than the high speed shared channel.

3. The method according to claim 2, wherein the high speed shared channel is a high speed downlink shared channel and the second radio channel is a forward access common channel.

4. The method according to claim 1, wherein the aggregate load is determined based on one or more of the following: data processing resources, hardware utilization, allocated radio channel resources, power, number of users on the high speed shared channel, or interference.

5. The method according to claim 1, further comprising the step of inactivating the inactivity timer for the first connection provided by the high speed shared channel if an activity level associated with the first connection exceeds a threshold or exceeds a threshold for a predetermined time period.

6. The method according to claim 1, wherein the first connection is detected as inactive when a corresponding amount of data to transmit over the first connection is less than a predetermined amount or is less than a predetermined amount for a predetermined period of time.

7. An apparatus in a mobile communications network supporting mobile radio communication using high speed shared channels associated with a cell coverage area, wherein each high speed shared channel provides connections to a plurality of mobile terminals sharing the high speed shared channel, the apparatus comprising:
   (a) means for determining an aggregate load associated with said plurality of mobile terminals sharing the high speed shared channel;
   (b) means for detecting inactivity on a first connection provided by the high speed shared channel to one of said plurality of mobile terminals;
   (c) means for setting a corresponding inactivity time period for the first connection based on the determined aggregate load associated with said plurality of mobile terminals sharing the high speed shared channel;
   (d) means for monitoring an activity level of the first connection, during the inactivity time period, to determine whether resources of the first connection should be released; and,
   (e) means for releasing the resources of the first connection if the monitored activity level does not increase above an activity threshold by the time the inactivity time period expires.

8. The apparatus according to claim 7, further comprising means for transferring the first connection to a second radio channel requiring fewer resources than the high speed shared channel.

9. The apparatus according to claim 8, wherein the high speed shared channel is a high speed downlink shared channel and the second radio channel is a forward access common channel.

10. The apparatus according to claim 7, wherein the aggregate load is determined based on one or more of the following: data processing resources, hardware utilization, allocated radio channel resources, power, number of users on the high speed shared channel, or interference.

11. The apparatus according to claim 7, further comprising means for inactivating the inactivity timer for the first connection provided by the high speed shared channel if an activity level associated with the first connection exceeds a threshold or exceeds a threshold for a predetermined time period.

12. The apparatus according to claim 7, wherein the first connection is detected as inactive when a corresponding amount of data to transmit over the first connection is less than a predetermined amount or is less than a predetermined amount for a predetermined period of time.

13. The apparatus according to claim 7, wherein the mobile communications network is a CDMA based network, the apparatus comprises a radio network controller, and the high speed shared channel is a high speed-downlink shared channel (HS-DSCH).

14. The apparatus according to claim 7, wherein the mobile communications network is a CDMA based network, the apparatus comprises a radio base station, and the high speed shared channel is a high speed-downlink shared channel (HS-DSCH).

* * * * *

UNITED STATES PATENT AND TRADEMARK OFFICE
CERTIFICATE OF CORRECTION

PATENT NO. : 8,385,938 B2
APPLICATION NO. : 11/720513
DATED : February 26, 2013
INVENTOR(S) : Karlsson Page 1 of 1

It is certified that error appears in the above-identified patent and that said Letters Patent is hereby corrected as shown below:

On the Title Page, in Item (75), under "Inventor", in Column 1, Line 1,
delete "Alta" and insert -- Älta --, therefor.

On the Title Page, in Item (57), under "ABSTRACT", in Column 2, Line 5,
delete "an connection" and insert -- a connection --, therefor.

In the Drawings:

In Fig. 5, Sheet 3 of 3, delete "  " and insert -- 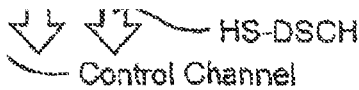 --, therefor.

In the Specification:

In Column 3, Line 4, delete "etc)." and insert -- etc.). --, therefor.

In Column 3, Line 30, delete "an connection" and insert -- a connection --, therefor.

In Column 4, Line 28, delete "channels;" and insert -- channels; and --, therefor.

In Column 5, Line 59, delete "monitors 28," and insert -- monitors 36, --, therefor.

In Column 5, Line 60, delete "controller 33" and insert -- controller 30 --, therefor.

In Column 6, Line 64, delete "an low" and insert -- a low --, therefor.

Signed and Sealed this
Eighteenth Day of June, 2013

Teresa Stanek Rea
*Acting Director of the United States Patent and Trademark Office*